United States Patent [19]

Kempf et al.

[11] Patent Number: 5,335,554
[45] Date of Patent: Aug. 9, 1994

[54] IMPACT FLOWMETER

[75] Inventors: David Kempf, Nineveh; William P. McCarthy, Indianapolis, both of Ind.

[73] Assignee: Endress + Hauser Inc., Greenwood, Ind.

[21] Appl. No.: 955,289

[22] Filed: Oct. 1, 1992

[51] Int. Cl.$^5$ .............................. G01F 1/30
[52] U.S. Cl. ................................ 73/861.73
[58] Field of Search ........... 73/861.73, 861.74, 861.75, 73/862.621, 862.541, 862.637

[56] References Cited

U.S. PATENT DOCUMENTS

| | | |
|---|---|---|
| 3,613,449 | 10/1971 | Soejima et al. |
| 3,640,135 | 2/1972 | Tomiyasu et al. |
| 3,640,136 | 2/1972 | Nolte ................... 73/861.73 |
| 3,742,762 | 7/1973 | Tomiyasu . |
| 4,069,709 | 1/1978 | Volk et al. ............ 73/861.73 |
| 4,128,001 | 12/1978 | Marks . |
| 4,157,661 | 6/1979 | Schindel . |
| 4,262,544 | 4/1981 | Herzl ................... 73/861.24 |
| 4,354,622 | 10/1982 | Wood . |
| 4,380,175 | 4/1983 | Griffen . |
| 4,407,380 | 10/1983 | Elder . |
| 4,440,029 | 4/1984 | Tomiyasu et al. |
| 4,441,101 | 4/1984 | Robar .................. 73/861.73 |
| 4,543,835 | 10/1985 | Volk et al. ............ 73/861.73 |
| 4,768,387 | 9/1988 | Kemp et al. . |
| 4,955,270 | 9/1990 | Volk ..................... 73/861.71 |
| 5,065,632 | 11/1991 | Reuter .................. 73/861.73 |

FOREIGN PATENT DOCUMENTS

2020038 11/1979 United Kingdom .

OTHER PUBLICATIONS

"Granumet-Bulk Solids Impact Flowmeter", Endress + Hauser Brochure, pp. 1–11, date unknown.
"Hyflo E-40 Solids Flowmeter", Milltronics Brochure, pp. 1–4, Aug. 1984.
"Hyflo Solids Flowmeters-Convenient Dust-Tight Accurate-Continuous in-line weighing", Milltronics Brochure, pp. 1–12, Sep. 1988.
"Milltronics Solids Flowmeters-Mass measurement of free flowing bulk solids", Milltronics Brochure, pp. 1–8, Nov. 1984.
"Economical continuous in-line weighing for even the tightest areas-Millflo solids flowmeter", Milltronics Brochure, pp. 1–2, May 1989.

*Primary Examiner*—Richard E. Chilcot, Jr.
*Assistant Examiner*—Harshad Patel
*Attorney, Agent, or Firm*—Barnes & Thornburg

[57] ABSTRACT

An impact flowmeter includes a housing having an inlet end, an outlet end, and an interior region. The flowmeter also includes an inlet chute coupled to the inlet end of the housing. The inlet chute has an open end for discharging material into the interior region of the housing. The flowmeter further includes a load cell coupled to the housing for generating an output signal, and an impact plate coupled to the load cell. The impact plate is aligned with the inlet chute so that material entering the housing strikes the impact plate. The impact plate deflects the load cell in a measurement direction to change the output signal from the load cell based on the flow rate of material. The flowmeter still further includes a stop for biasing the load cell in the measurement direction to establish a preload condition on the load cell, thereby reducing the affect of vibration on the output signal from the load cell. The flowmeter further includes a load cell mounting bracket located outside the interior region of housing to isolate the load cell from the interior region of the housing. The flowmeter includes a gasket for insulating the load cell from the housing to reduce the effect of ambient vibrations of the housing on the load cell. The impact plate is adjustable vertically and horizontally relative to the inlet chute.

30 Claims, 2 Drawing Sheets

IMPACT FLOWMETER

BACKGROUND AND SUMMARY OF THE INVENTION

This invention relates to an impact flowmeter. More particularly, the present invention relates to an impact flowmeter which provides increased accuracy and reliability compared to conventional impact flowmeters.

It is known to provide an impact flowmeter situated in a flow conduit to determine the flow rate of bulk material through the conduit. Known impact flowmeters include an impact plate located in a flow stream so that bulk material passing through the flowmeter strikes the impact plate. A load cell is typically coupled to the impact plate to provide an output signal proportional to the flow rate of the bulk material through the conduit. The output signal from the load cell can be processed to determine the mass flow rate of the bulk material through the conduit.

The present invention is an improvement over conventional impact flowmeters. The present invention provides an accurate, reliable design which is relatively inexpensive to manufacture and easy to install. The present invention provides a low cost impact flowmeter for measuring continuous flow of most bulk solids. The impact flowmeter of the present invention is designed to fit into existing processes and provides an economical alternative to some loss-in-weight in volumetric batching systems. The flowmeter can be used with most mechanical conveying systems including belt conveyors, air slides, rotary valves, drag conveyors, screw conveyors, and vibratory conveyors. Typical applications for the impact flowmeter of the present invention include flow rate control, batching, loading and mix ratio control. Typical industries which may be served by the present invention include mining, chemical, plastics, food, grain and animal feed.

One problem associated with conventional impact flowmeters is that the impact flowmeters become inaccurate due to ambient system vibration or due to vibration caused by the bulk material flowing through the impact flowmeter. Another problem associated with conventional flowmeters is that temperature extremes, dust, and material build-up on the load cell itself can cause inaccuracies. This build-up problem becomes worse when corrosive or abrasive materials are processed.

One object of the present invention is to reduce the effect of vibration on the accuracy of the output of the load cell.

Another object of the present invention is to isolate the load cell from the process environment within a housing of the impact flowmeter to protect the load cell from process temperature extremes, dust, and material built-up on the load cell.

Yet another object of the present invention is to provide means for adjusting the position of the load cell and impact plate relative to the housing so that the impact plate is optimally positioned relative to a material inlet chute to provide proper bulk solid material impact with the impact plate.

According to one aspect of the present invention, an impact flowmeter includes a housing having an inlet end, an outlet end, and an interior region. The flowmeter also includes an inlet chute coupled to the inlet end of the housing. The inlet chute has an open end for discharging material into the interior region of the housing. The flowmeter further includes a load cell coupled to the housing for generating an output signal, and an impact plate coupled to the load cell. The impact plate is aligned with the inlet chute so that material entering the housing strikes the impact plate. The impact plate deflects the load cell in a measurement direction to change the output signal from the load cell based on the flow rate of material. The flowmeter still further includes means for biasing the load cell in the measurement direction to establish a preload condition on the load cell, thereby reducing the affect of vibration on the output signal from the load cell.

In the illustrated embodiment, the load cell is coupled to the housing by a load cell mounting bracket. The biasing means includes a stop coupled to the load cell mounting bracket. The position of the stop is adjustable relative to the load cell to apply a biasing force to the load cell in the measurement direction.

According to another aspect of the invention, an impact flowmeter includes a housing having an inlet end, an outlet, and an interior region. The flowmeter also includes an inlet chute coupled to the inlet end of the housing. The inlet chute has an open end for discharging material into the interior region of the housing. The flowmeter further includes a load cell and a load cell mounting bracket located outside the interior region of housing to isolate the load cell from the interior region of the housing. The load cell mounting bracket is coupled to a wall of the housing and to the load cell to secure the load cell to the housing. The flowmeter still further includes an impact plate and means for coupling the impact plate to the load cell to align the impact plate with the inlet chute so that material entering the interior region of the housing strikes the impact plate.

According to yet another aspect of the present invention, an impact flowmeter includes a housing having an inlet end, an outlet end, and an interior region. The flowmeter also includes an inlet chute coupled to the inlet end of the housing. The inlet chute has an open end for discharging material into the interior region of the housing. The flowmeter further includes a load cell for generating an output signal, and means for coupling the load cell to a wall of the housing. The flowmeter still further includes an impact plate coupled to the load cell to align the impact plate with the inlet chute so that material entering the interior region of the housing strikes the impact plate to change the output signal from the load cell. In addition, the flowmeter includes means for insulating the load cell from the housing to reduce the effect of ambient vibrations of the housing on the load cell. In the illustrated embodiment, the insulating means includes a gasket located between the load cell coupling means and the housing.

According to still another aspect of the present invention, an impact flowmeter includes a housing having an inlet end, an outlet end, and an interior region. The flowmeter also includes an inlet chute coupled to the inlet end of the housing. The inlet chute has an open end for discharging material into the interior region of the housing. The flowmeter further includes a load cell coupled to the housing for generating an output signal, and an impact plate coupled to the load cell. The impact plate is aligned with the inlet chute so that material entering the housing strikes the impact plate. The impact plate deflects the load cell in a measurement direction to change the output signal from the load cell based on the flow rate of material. The flowmeter still further includes means for adjusting the position of the impact plate vertically and horizontally relative to the inlet chute.

In the illustrated embodiment, the flowmeter includes means for coupling the load cell to the housing so that the position of the load cell relative to the housing is adjustable to change the position of the impact plate relative to the inlet chute. In addition, the flowmeter includes means for coupling the impact plate to the load cell so that the position of the impact plate relative to the load cell is also adjustable to change the position of the impact plate relative to the inlet chute.

The impact plate is coupled to the load cell by an impact plate mounting bracket coupled to a measurement leg of the load cell. The impact plate mounting bracket is formed to include an elongated slot therein. The load cell is coupled to the impact plate mounting bracket by two fasteners extending through the elongated slot to permit the impact plate mounting bracket to slide relative to the load cell to adjust the position of the impact plate relative to the load cell and inlet chute.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
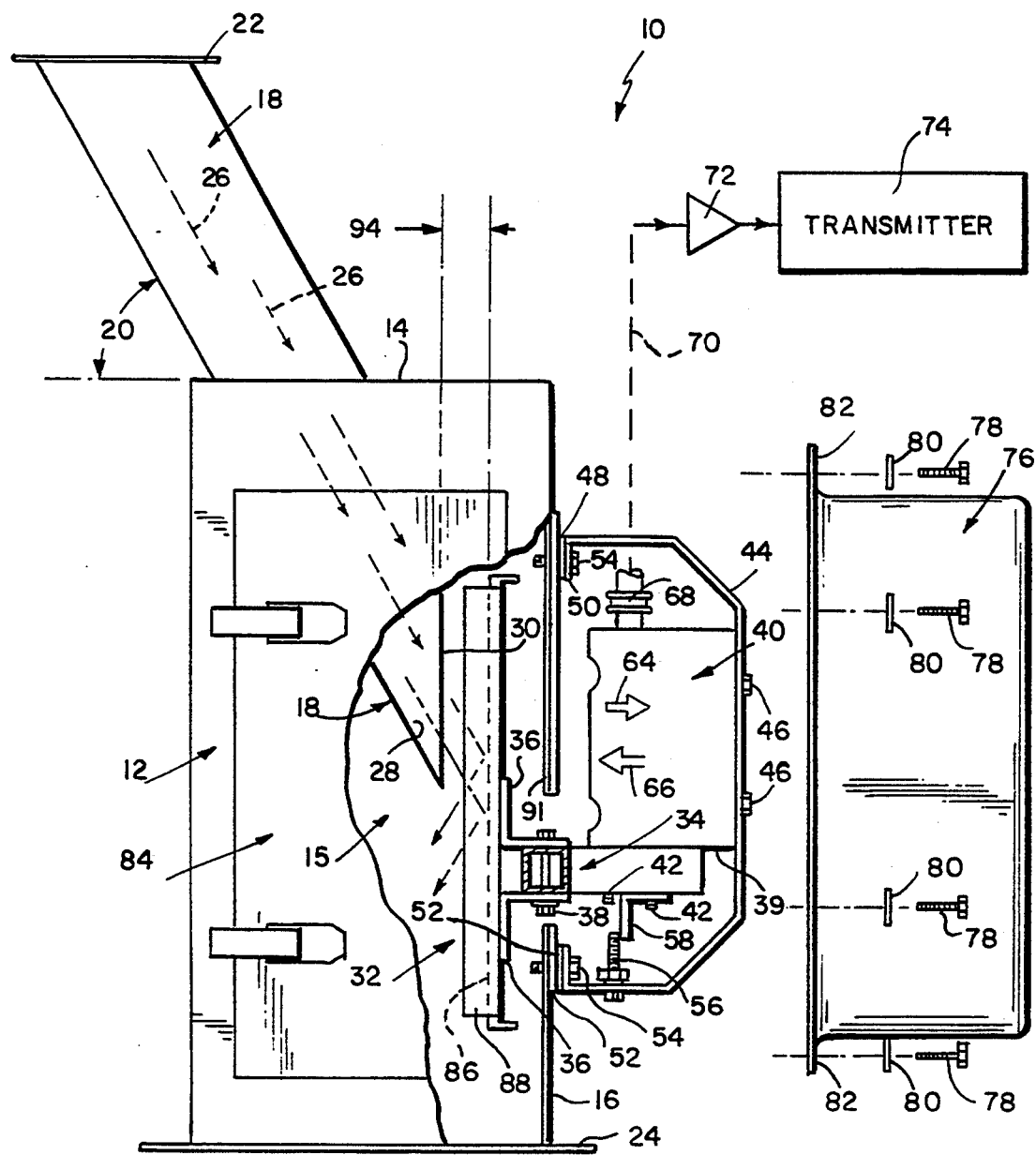
FIG. 1 is a side elevational view, with portions broken away, illustrating the impact flowmeter of the present invention.

Referring now to the drawings, FIG. 1 illustrates an impact flowmeter 10 of the present invention. The impact flowmeter 10 includes a housing 12 having a top wall 14 and a rear wall 16. An inlet chute 18 extends through top wall 14 and into an interior region 15 of housing 12. Inlet chute 18 is aligned a predetermined angle 20 relative to top surface 14 of housing 12. In the preferred embodiment angle 20 is 60 degrees. A top flange 22 is coupled to a top end of inlet chute 18. Flange 22 is designed to be coupled to an existing conduit for a bulk material (not shown). A bottom flange 24 is coupled to a bottom end of housing 12 for coupling to the conduit. Flange 22 is substantially parallel to flange 24 to facilitate mounting flowmeter 10 in existing process conduits.

Material flows through inlet chute 18 in the direction of arrows 26. Most of the material flows against a bottom surface 28 of inlet chute 18. The material is discharged from an open end 30 of inlet chute 18 into interior region 15 of housing 12. Material passing through open end 30 of inlet chute 18 strikes an impact plate 32. Impact plate 32 is coupled to a T-shaped mounting bracket 34 by angle iron rails 36 and fasteners 38. T-shaped mounting bracket 34 is coupled to a measuring leg 39 of parallelogram load cell 40 by fasteners 42. Because impact plate 32 is perpendicular to T-shaped mounting bracket 34, only horizontal forces are transmitted to load cell 40 from impact plate 32. Illustratively, load cell 40 is a Type 1418 load cell available from Lorenz Messtechnik GmbH in Aldorf, Germany.

Load cell 40 is coupled to rear wall 16 of housing 12 by a load cell mounting bracket 44. Load cell 40 is mounted by bracket 44 exterior to housing 12 and is physically isolated from the environment of the process region 15 of housing 12. Load cell 40 is coupled to mounting bracket 44 by fasteners 46. Load cell mounting bracket 44 is physically insulated from rear wall 16 of housing 12 by neoprene gaskets 48 located between rear wall 16 of housing 12 and flanges 50 and 52 of load cell mounting bracket 44. Fasteners 54 are used to secure load cell mounting bracket 44 to rear wall 16 of housing 12. Gaskets 48 provide insulation to help damp or isolate load cell 40 from ambient vibration sources which can cause measurement errors in an output signal from load cell 40.

Figure 2:
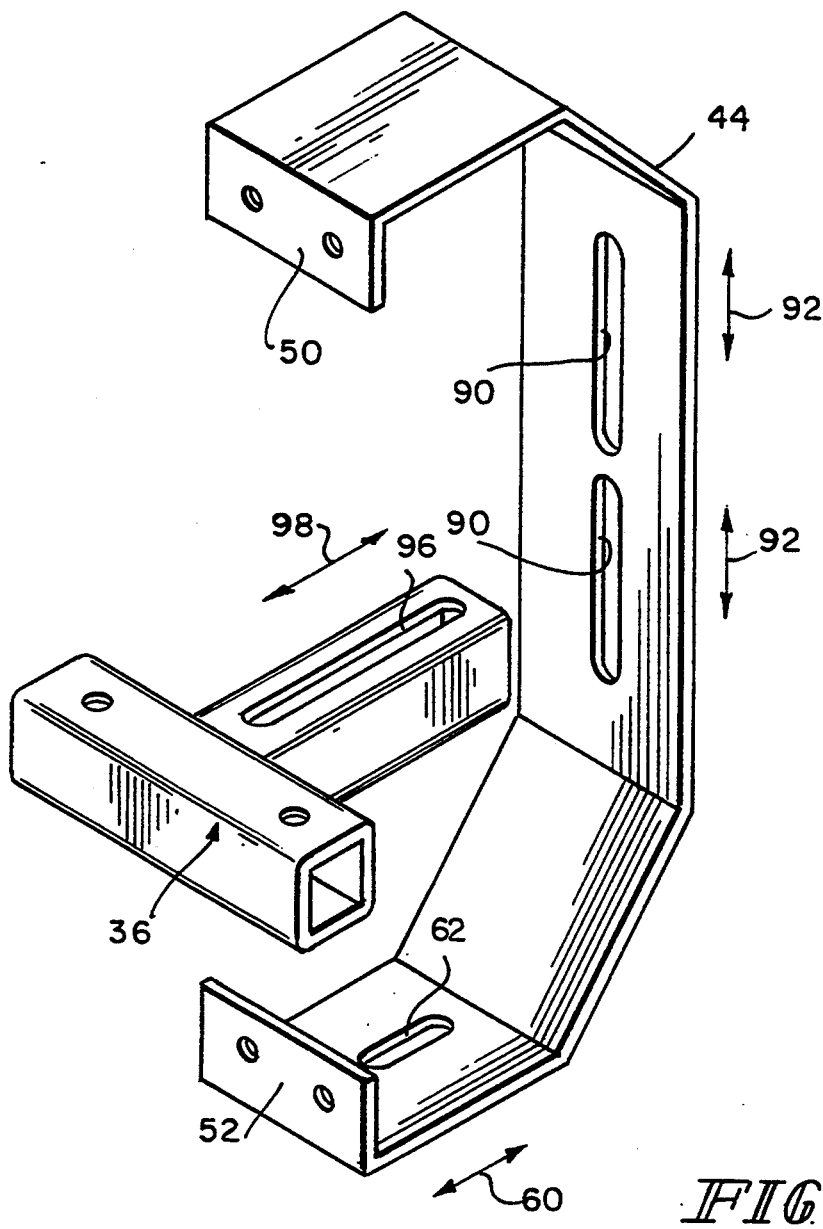
FIG. 2 is a perspective view illustrating the configuration of a T-shaped impact plate mounting bracket for coupling the impact plate to the load cell and illustrating the configuration of a load cell mounting bracket for coupling the load cell to the housing.

Impact flowmeter 10 includes an adjustable damper or stop 56. Stop 56 engages an angle iron bracket 58 coupled to T-shaped mounting bracket 34 by fastener 42. Stop 56 is slidable back and forth in the direction of arrow 60 inside slot 62 of load cell mounting bracket 44 as illustrated in FIG. 2 and discussed in detail below.

As material strikes impact plate 32, impact plate 32 moves in a measurement direction illustrated by arrow 64. Because impact plate 32 is coupled to measuring leg 39 of load cell 40, only horizontal forces in the measurement direction illustrated by arrow 64 are measured by load cell 40. Stop 56 prevents movement of load cell 40 in a non-measurement direction illustrated by arrow 66. Movement in the non-measurement direction may permanently damage the load cell.

Load cell 40 generates an output signal through shielded cable 68. Load cell 40 generates an output voltage on wire 70 proportional to the force applied to load cell 40 by impact plate 32. Wire 70 is coupled to an input of preamplifier 72. An output of preamplifier 72 is coupled to a transmitter 74. Illustratively, preamplifier 72 is a HS 10 preamplifier available from Endress + Hauser, Inc. in Greenwood, Ind. Illustratively, transmitter 74 may be either a DME671, a DME170, or a DME270 transmitter available from Endress + Hauser, Inc. in Greenwood, Ind.

Impact plate 32 which is directly attached to load cell 40 is deflected by an amount proportional to mass flow of material striking impact plate 32. Deflection of load cell 40 produces a change in load cell voltage output, which is also proportional to the mass flow of material through housing 12. The change in voltage output from load cell 40 is converted to a pulsed frequency modulation (PFM) signal within preamplifier 72. The signal is then transmitted to transmitter 74 which computes, displays and outputs the mass flow signal generated by impact flowmeter 10.

A cover 76 is provided for attachment to the rear surface 16 of housing 12 to cover and protect mounting bracket 44 and load cell 40. Cover 76 is secured to rear wall 16 of housing 12 by fasteners 78 and washers 80. Fasteners 78 extend through a flange 82 of cover 76 and into rear wall 16 of housing 12.

Housing 12 includes an access door 84. Access door 84 provides easy entry into interior region 15 of housing 12. This allows easy cleaning, adjustment, and impact plate liner replacement.

In operation, impact flowmeter 10 is installed into a process conduit to determine the mass flow rate of material through the conduit. Flange 22 is parallel to flange 24. This allows easy mounting into existing processes. Material moving down inlet chute 18 strikes impact plate 32 against a flat impact plate surface 86. Impact plate surface 86 is located in a vertical arrangement within housing 12. The flat, vertical impact plate 32 produces greater measuring accuracy due to decreased friction as the bulk solid material makes contact with impact plate surface 86. Outer flanges 88 are coupled to side edges of flat impact plate surface 86.

The flat impact plate surface 86 provides a measurement which is typically more accurate than angled and/or curved impact plates which may be affected by friction as the material slides off the curved or angled impact plate. Flat, vertical impact plate surface 86 is also less susceptible to bulk solid material build-up which can cause measurement inaccuracies. Flat impact plate surface 86 can be easily modified by adding liners that are resistant to highly abrasive materials if necessary.

Most of the material flowing through inlet chute 18 moves along bottom surface 28 of inlet chute 18 and strikes impact plate surface 86 adjacent impact plate mounting bracket 34. Impact plate 32 extends upwardly from mounting bracket 34 by a distance large enough to deflect any material which may enter housing 12 near a top edge of inlet chute 18.

As discussed above, load cell 40 is isolated from interior region 15 of housing 12. In other words, load cell 40 is located outside interior region 15 of housing 12 defined by rear wall 16. Impact plate mounting bracket 34 extends through an aperture 91 formed in rear wall 16 so that impact plate 32 located in interior region 15 of housing 12 cooperates with load cell 40 outside of interior region 15. Because load cell 40 is physically isolated from the process environment within interior region 15 of housing 12, load cell 40 is protected from process temperature extremes, dust, and material build-up on the load cell 40. This isolation improves the accuracy of measurements from load cell 40. This is especially important when processing corrosive or abrasive materials.

Material striking impact plate surface 86 moves load cell 40 only in the measurement direction 64. In other words, load cell 40 is connected to impact plate 32 so that only horizontal forces have an effect on load cell 40. Therefore, any material build-up on impact plate surface 86 does not introduce measurement inaccuracies to load cell 40.

After impact flowmeter 10 is installed into the process conduit, stop 56 is adjusted by sliding the stop 56 inside slot 62 of load cell mounting bracket illustrated in FIG. 2 until stop 56 engages angle iron bracket 58 coupled to T-shaped mounting bracket 34. By monitoring the output of load cell 40 from transmitter 74, an operator can determine when stop 56 engages angle iron 58 because the output signal will increase as stop 56 engages angle iron 58. During the initial setup and calibration of flowmeter 10, stop 56 is adjusted to place a constant load or biasing force on load cell 40 in the measurement direction illustrated by arrow 64. The output signal from the biased load cell 40 is then measured and set as a "zero" value for subsequent measuring flow of material.

As bulk solid material makes contact with impact plate 32 which is coupled to load cell 40, the measuring leg of load cell 40 is forced away from stop 56 in the measurement direction illustrated by arrow 64 to produce a measurable voltage output from load cell 40. In other words, stop 56 provides a preload on load cell 40. This preload condition has several advantages. One advantage is that the load cell 40 is protected from overloads in the non-measurement direction illustrated by arrow 66. Stop 56 prevents load cell 40 from moving beyond stop 56 in the non-measurement direction 66. Such an overload in a non-measurement direction can be transmitted to the load cell during installation, cleaning, and while making adjustments. The overload can damage load cell 40.

In addition, load cell 40 returns to a definite "zero" point when there is no material striking the impact plate. A load cell in its free stage with no preload will not necessarily return to exactly the same "zero" point due to internal stresses in the load cell material as loads are applied and removed from the load cell. This results in measurement errors when used in an impact flowmeter application. Stop 56 and angle iron 58 which establish a preload condition on load cell 40 ensure that load cell 40 returns to a definite "zero" point when no material is contacting impact plate 32 to increase the accuracy of load cell 40.

Stop 56 and angle iron 58 also prevent load cell 40 from vibrating or oscillating due to an interruption in the material flow striking impact plate 32. As load cell 40 returns to stop 56, all vibrations or oscillations are immediately damped to "zero". Vibrations or oscillations of load cell 40 are interpreted as bulk material flow in impact flowmeters and would yield inaccurate flow measurements. Damper or stop 56 also reduces the effect of ambient vibrations on impact flowmeter 10. Without the stop 56, ambient vibration is interpreted as bulk flow in the impact flowmeter 10 and would yield inaccurate material flow measurements.

Load cell mounting bracket 44 is designed so that the position of load cell 40 is adjustable approximately two inches in the vertical or "Y" direction as illustrated by double headed arrow 92 in FIG. 2. As illustrated in FIG. 2, load cell can move up and down vertically within slots 90 formed in mounting bracket 44. Fasteners 46 extend through slots 90 to couple load cell 40 to mounting bracket 44. Fasteners 46 are tightened to secure load cell 40 to mounting bracket 44 after the proper vertical position is selected.

In addition, the position of impact plate 32 relative to open end 30 of inlet chute 18 illustrated by dimension 94 in FIG. 1 can be adjusted by loosening fasteners 42 and sliding T-shaped mounting bracket 34 horizontally relative to load cell 40. As illustrated in FIG. 2, a slot 96 is provided in T-shaped mounting bracket 34 to permit mounting bracket 34 to move relative to load cell 40 in the direction of double-headed arrow 98. Impact plate is adjustable approximately 1.5 inches in the horizontal or "X" direction. By adjusting the position of impact plate 32 vertically and horizontally in the directions of arrows 92 and 98, impact plate 32 can be optimally positioned relative to inlet chute 18 to provide bulk solid material impact with impact plate 32. Proper bulk solid material impact with impact plate 32 provides consistent calibration, repeatability, and accuracy of the output from transmitter 74. Preferably, material should strike impact plate 32 at a location adjacent impact plate mounting bracket 34.

Although the invention has been described in detail with reference to a certain preferred embodiment, variations and modifications exist within the scope and spirit of the invention as described and defined in the following claims.

What is claimed is:

1. An impact flowmeter comprising:
a housing having an inlet end, an outlet end, and an interior region;
an inlet chute coupled to the inlet end of the housing, the inlet chute having an open end for discharging material into the interior region of the housing;
a load cell coupled to the housing for generating an output signal;
an impact plate;
an impact plate mounting bracket coupled to the impact plate and to the load cell, the impact plate being aligned with the inlet chute so that material entering the housing strikes the impact plate, the impact plate mounting bracket deflecting the load cell in a measurement direction to change the output signal from the load cell based on the flow rate of material; and
a stop coupled to the housing for engaging the impact plate mounting bracket to apply a biasing force to the load cell in the measurement direction to establish a preload condition on the load cell in the measurement direction and a limit position for the load cell in a nonmeasurement direction, the stop permitting movement of the impact plate mounting bracket relative to the stop in the measurement direction, and the stop blocking movement of the impact plate mounting bracket in a nonmeasurement direction beyond the limit position, thereby reducing the affect of vibration on the output signal from the load cell.

2. The flowmeter of claim 1, wherein the load cell is coupled to the housing by a load cell mounting bracket located outside the interior region of the housing to isolate the load cell from the interior region of the housing, the load cell mounting bracket being coupled to a wall of the housing.

3. The flowmeter of claim 2, wherein the load cell mounting bracket is insulated from the wall of the housing by gaskets located between the load cell mounting bracket and the wall of the housing to reduce the affect of ambient vibrations of the housing on the load cell.

4. The flowmeter of claim 1, further comprising means for coupling the load cell to the housing so that the position of the load cell relative to the housing is adjustable to change the position of the impact plate relative to the inlet chute.

5. The flowmeter of claim 4, further comprising means for coupling the impact plate to the load cell so that the position of the impact plate relative to the load cell is also adjustable to change the position of the impact plate relative to the inlet chute.

6. The flowmeter of claim 1, further comprising means for coupling the impact plate to the load cell so that the position of the impact plate relative to the load cell is adjustable to change the position of the impact plate relative to the inlet chute.

7. The flowmeter of claim 1, wherein the impact plate is coupled to the load cell by an impact plate mounting bracket coupled to a measurement leg of the load cell.

8. The flowmeter of claim 7, wherein the impact plate mounting bracket is formed to include an elongated slot therein, the load cell being coupled to the impact plate mounting bracket by a fastener extending through the elongated slot to permit the impact plate mounting bracket to slide relative to the load cell to adjust the position of the impact plate relative to the load cell and inlet chute.

9. The flowmeter of claim 7, wherein the impact plate mounting bracket is T-shaped.

10. The flowmeter of claim 1, wherein the load cell is coupled to the housing by a load cell mounting bracket and the stop is coupled to the load cell mounting bracket, the position of the stop being adjustable relative to the load cell to change the biasing force applied to the load cell in the measurement direction.

11. An impact flowmeter comprising:
a housing having an inlet end, an outlet, and an interior region;
an inlet chute coupled to the inlet end of the housing, the inlet chute having an open end for discharging material into the interior region of the housing;
a load cell;
a load cell mounting bracket located outside the interior region of housing to isolate the load cell from the interior region of the housing, the load cell mounting bracket being coupled to a wall of the housing and formed to include an elongated slot therein;
a fastener extending through the elongated slot of the load cell mounting bracket to couple the load cell to the load cell mounting bracket to secure the load cell to the housing, the fastener being slidable in the elongated slot of the load cell mounting bracket to adjust the vertical position of the load cell relative to the housing;
an impact plate;
means for coupling the impact plate to the load cell, thereby permitting the position of the impact plate relative to the housing to be adjusted vertically upon vertical movement of the fastener in the elongated slot of the load cell mounting bracket to align the impact plate with the inlet chute so that material entering the interior region of the housing strikes the impact plate.

12. The flowmeter of claim 11, further comprising a stop coupled to load cell mounting bracket, the stop biasing the load cell in a measurement direction.

13. The flowmeter of claim 11, wherein the means for coupling the impact plate to the load cell includes an impact plate mounting bracket formed to include an elongated slot therein, and a fastener extending through the elongated slot of the impact plate mounting bracket to secure the impact plate mounting bracket to a measurement leg of the load cell, the fastener being slidable in the elongated slot of the impact plate mounting bracket to adjust a horizontal position of the impact plate relative to the housing.

14. The flowmeter of claim 13, further comprising a stop coupled to the load cell mounting bracket and means coupled to the impact plate mounting bracket for engaging the stop to bias the load cell in the measurement direction.

15. The flowmeter of claim 11, wherein the load cell mounting bracket is insulated from a wall of the housing by gaskets located between the mounting bracket and the wall of the housing to reduce the affect of ambient vibrations of the housing on the load cell.

16. The flowmeter of claim 11, further comprising a cover for surrounding the load cell mounting bracket and the load cell, the cover being coupled to the housing to protect the load cell.

17. An impact flowmeter comprising:

a housing having an inlet end, an outlet end, and an interior region;

an inlet chute coupled to the inlet end of the housing, the inlet chute having an open end for discharging material into the interior region of the housing;

a load cell for generating an output signal;

a load cell mounting bracket for coupling the load cell to the housing;

an impact plate;

an impact plate mounting bracket coupled to a measurement leg of the load cell and to the impact plate to align the impact plate with the inlet chute so that material entering the housing strikes the impact plate, the impact plate deflecting the load cell in a measurement direction to change the output signal from the load cell based on the flow rate of material, the impact plate mounting bracket being formed to include an elongated slot therein, the load cell being coupled to the impact plate mounting bracket by a fastener extending through the elongated slot to permit the impact plate mounting bracket to slide relative to the load cell to adjust the position of the impact plate horizontally relative to the load cell and the inlet chute.

18. The flowmeter of claim 17, further comprising means for biasing the load cell in the measurement direction to establish a preload condition on the load cell, thereby reducing the affect of vibration on the output signal from the load cell.

19. The flowmeter of claim 18, wherein the load cell is coupled to the housing by a load cell mounting bracket and the biasing means includes a stop coupled to the load cell mounting bracket, the stop engaging the impact plate mounting bracket to apply a biasing force to the load cell in the measurement direction, the position of the stop being adjustable relative to the load cell to change the biasing force applied to the load cell in the measurement direction.

20. The flowmeter of claim 17, further comprising means for insulating the load cell from the housing to reduce the effect of ambient vibrations of the housing on the load cell, wherein the insulating means includes a gasket located between the load cell coupling means and the housing.

21. The flowmeter of claim 20, wherein the gasket is made of neoprene.

22. The flowmeter of claim 17, wherein the position of the load cell relative to the housing is adjustable to change the position of the impact plate vertically relative to the inlet chute.

23. An impact flowmeter comprising:
a housing having an inlet end, an outlet end, and an interior region;

an inlet chute coupled to the inlet end of the housing, the inlet chute having an open end for discharging material into the interior region of the housing;

a load cell for generating an output signal;

a load cell mounting bracket for coupling the load cell to the housing;

an impact plate;

an impact plate mounting bracket coupled to a measurement leg of the load cell and to the impact plate to align the impact plate with the inlet chute so that material entering the housing strikes the impact plate, the impact plate mounting bracket deflecting the load cell in a measurement direction to change the output signal from the load cell based on the flow rate of material, the load cell mounting bracket being formed to include an elongated slot to permit the position of the load cell to be adjusted vertically relative to the housing to change the position of the impact plate vertically relative to the inlet chute.

24. The flowmeter of claim 23, wherein the position of the impact plate relative to the load cell is adjustable to change the position of the impact plate horizontally relative to the inlet chute.

25. An impact flowmeter comprising:
a housing having an inlet end, an outlet end, and an interior region;

an inlet chute coupled to the inlet end of the housing, the inlet chute having an open end for discharging material into the interior region of the housing;

a load cell coupled to the housing for generating an output signal;

an impact plate coupled to the load cell, the impact plate being aligned with the inlet chute so that material entering the housing strikes the impact plate, the impact plate deflecting the load cell in a measurement direction to change the output signal from the load cell based on the flow rate of material;

means for adjusting a vertical position of the impact plate relative to the inlet chute so that the impact plate is properly aligned with the inlet chute in a vertical direction; and means for adjusting a horizontal position of the impact plate relative to the inlet chute so that the impact plate is properly aligned with the inlet chute in a horizontal direction.

26. The flowmeter of claim 25, wherein the load cell is coupled to the housing by a load cell mounting bracket, the load cell mounting bracket being coupled to a wall of the housing, and the impact plate is coupled to the load cell by an impact plate mounting bracket coupled to a measurement leg of the load cell.

27. The flowmeter of claim 26, wherein the load cell mounting bracket is located outside the interior region of the housing to isolate the load cell from the interior region of the housing.

28. The flowmeter of claim 25, further comprising means for insulating the load cell from the housing to reduce the effect of ambient vibrations of the housing on the load cell.

29. The flowmeter of claim 28, wherein the insulating means includes a gasket located between the load cell and the housing for reducing the affect of ambient vibrations of the housing on the output signal from the load cell.

30. The flowmeter of claim 25, further comprising means for biasing the load cell in the measurement direction to establish a preload condition on the load cell, thereby reducing the affect of vibration on the output signal from the load cell.

* * * * *